US011530960B1

(12) United States Patent
Alvarez et al.

(10) Patent No.: US 11,530,960 B1
(45) Date of Patent: Dec. 20, 2022

(54) METHOD OF TESTING FOR LEAKS IN THE PIPING SYSTEM OF A BUILDING

(71) Applicant: Plumbing Diagnostics Corp., Miami, FL (US)

(72) Inventors: Reynaldo Alvarez, Miami, FL (US); Reynaldo Alvarez, Jr., Miami, FL (US); Valerie Guerra, Miami, FL (US)

(73) Assignee: Plumbing Diagnostics Corp., Miami, FL (US)

( * ) Notice: Subject to any disclaimer, the term of this patent is extended or adjusted under 35 U.S.C. 154(b) by 153 days.

(21) Appl. No.: 17/080,952

(22) Filed: Oct. 27, 2020

(51) Int. Cl.
*G01M 3/28* (2006.01)
*G01M 3/22* (2006.01)

(52) U.S. Cl.
CPC .......... *G01M 3/2861* (2013.01); *G01M 3/223* (2013.01)

(58) Field of Classification Search
CPC .................................................. G01M 3/2853
See application file for complete search history.

(56) References Cited

U.S. PATENT DOCUMENTS

| 3,827,282 | A | | 8/1974 | Brister | |
|---|---|---|---|---|---|
| 4,926,680 | A | | 5/1990 | Hasha et al. | |
| 5,467,640 | A | | 11/1995 | Salinas | |
| 5,495,750 | A | | 3/1996 | Dufresne | |
| 5,581,018 | A | * | 12/1996 | Allen | G01M 3/2853 |
| | | | | | 138/93 |
| 5,740,830 | A | * | 4/1998 | Mankins | G01M 3/2807 |
| | | | | | 137/15.07 |
| 8,731,849 | B2 | | 5/2014 | Westra et al. | |
| 2004/0163446 | A1 | * | 8/2004 | Ball | G01M 3/02 |
| | | | | | 73/37 |

(Continued)

FOREIGN PATENT DOCUMENTS

| CN | 105738219 | 7/2018 |
|---|---|---|
| EP | 1749944 | 10/2009 |

OTHER PUBLICATIONS

248 CMR: Uniform State Plumbing Code (Mass. Register #1334 Mar. 10, 2017). https://www.mass.gov/doc/248-cmr-1000-uniform-state-plumbing-code-0/download (Year: 2017).*

(Continued)

*Primary Examiner* — Paul M. West
*Assistant Examiner* — Mark A Shabman
(74) *Attorney, Agent, or Firm* — Allen, Dyer, Doppelt & Gilchrist, P.A.

(57) ABSTRACT

A method of testing for leaks within substantially the entirety of a piping system of a building or a section thereof. The method comprises isolation of a main of the piping system and removal of the building fixtures. Optionally, a line trace and/or a dye test may be implemented. The method further comprises purging the piping system to at least partially reduce or eliminate entrapped air. The method further comprises sealing the plumbing outlets of the piping system and filling the piping system up to a predetermined elevation above a highest fitting connection or up to the highest serviceable point of the system. The method further comprises inspecting the piping system for leaks after a predetermined period of time, which may be anywhere from immediately after filling the piping system to about twenty minutes thereafter.

16 Claims, 4 Drawing Sheets

(56) References Cited

U.S. PATENT DOCUMENTS

2007/0028675 A1* 2/2007 O'Sullivan ......... G01M 3/2815
73/49.1
2016/0341625 A1* 11/2016 Parker .................... G01M 3/20

OTHER PUBLICATIONS

Hydrostatic Pressure Testing & Diagnostic Plumbing, Accurate Leak and Line, www.accurateleak.com/services/diagnostic-plumbing/, Oct. 26, 2020.
Plumbing Drain Testing, Professional Engineering Inspections, Inc., https://profengineering.com/plumbing-drain-testing, Oct. 26, 2020.

* cited by examiner

METHOD OF TESTING FOR LEAKS IN THE PIPING SYSTEM OF A BUILDING

FIELD OF INVENTION

The present invention relates to hydrostatic testing methods of testing for leaks in piping systems of buildings.

BACKGROUND

In various industries, including the construction industry and in home building, piping systems are often times susceptible to leaks. Such piping systems may include drainage systems, sanitary systems, water supply systems, fire sprinkler systems, and/or any other related system. Leaks may occur for various reasons, including the fact that piping systems may decay, may have faulty components such as connections or fixtures, may comprise faulty installations or may otherwise be susceptible to damage for example, due to settling of the foundation system. Other more drastic events that may also create leaks include flooding, fires or hurricanes, which may affect the integrity of the underlying piping system. Accordingly, often times it becomes necessary to test the underlying piping system to ascertain the location of a leak. Testing may need to be done as a part of a routine operation. Alternatively, testing may need to be done if a leak is known to exist but its location has not been identified. Often times, it is impossible to determine the precise location of an existing leak when implementing a hydrostatic test around sections of a building. Thus, an advantage in the industry may be realized by providing a testing method that may be used to test an entire piping system in a hydrostatic condition. A further benefit would be realized by providing a testing method that may be implemented in connection with an isolated main of the underlying piping system such that the piping system may also be isolated from a municipal system and may be tested in its entirety.

SUMMARY

The present invention is directed to a method of testing for leaks within substantially the entirety of a piping system of a building, or alternatively a section of the entire piping system. Such a piping system may include one or more of a supply system, drainage system and/or fire sprinkler system. The inventive method contemplates isolation of a corresponding main of the building's piping system, i.e., water supply main, main drain, main fire sprinkler supply line, etc. The method further comprises removal of the building fixtures, i.e., sink faucets, toilets, showers heads, shower faucets, bathtub faucets, etc., and/or removal of the P-traps. After removal of the building fixtures and/or P-traps, a line trace and/or a dye test may optionally be implemented.

The method further comprises purging the piping system to at least partially reduce or eliminate entrapped air within the piping system. This may be accomplished by using water from the building's water supply system, for example, by filling the piping system at least to a ground or floor elevation, or higher. Furthermore, purging the piping system may be accomplished with open airways, i.e., unplugged or unsealed plumbing outlets. The method further comprises sealing the plumbing outlets of the piping system, which may be done after isolating the main drain or main supply line, as well as after filling and purging the piping system. The method further comprises filling the piping system up to a predetermined elevation, which may be a predetermined elevation above the highest fitting connection within a section of the piping system. By way of example only, the piping system may be filled up to at least five feet, or more, above a highest serviceable point of a section. The piping system may also be filled up to the overall highest serviceable point of the piping system. Alternatively, the piping system may be filled up to an elevation above the highest serviceable point of the system. The method according to the present invention further comprises inspecting the piping system for leaks after a predetermined period of time, which may be anywhere from immediately after filling the piping system to about twenty minutes thereafter. In at least on embodiment, an inspection of the piping system for leaks may be conducted about fifteen (15) minutes after substantially filling the piping system.

DETAILED DESCRIPTION

Figure 1:
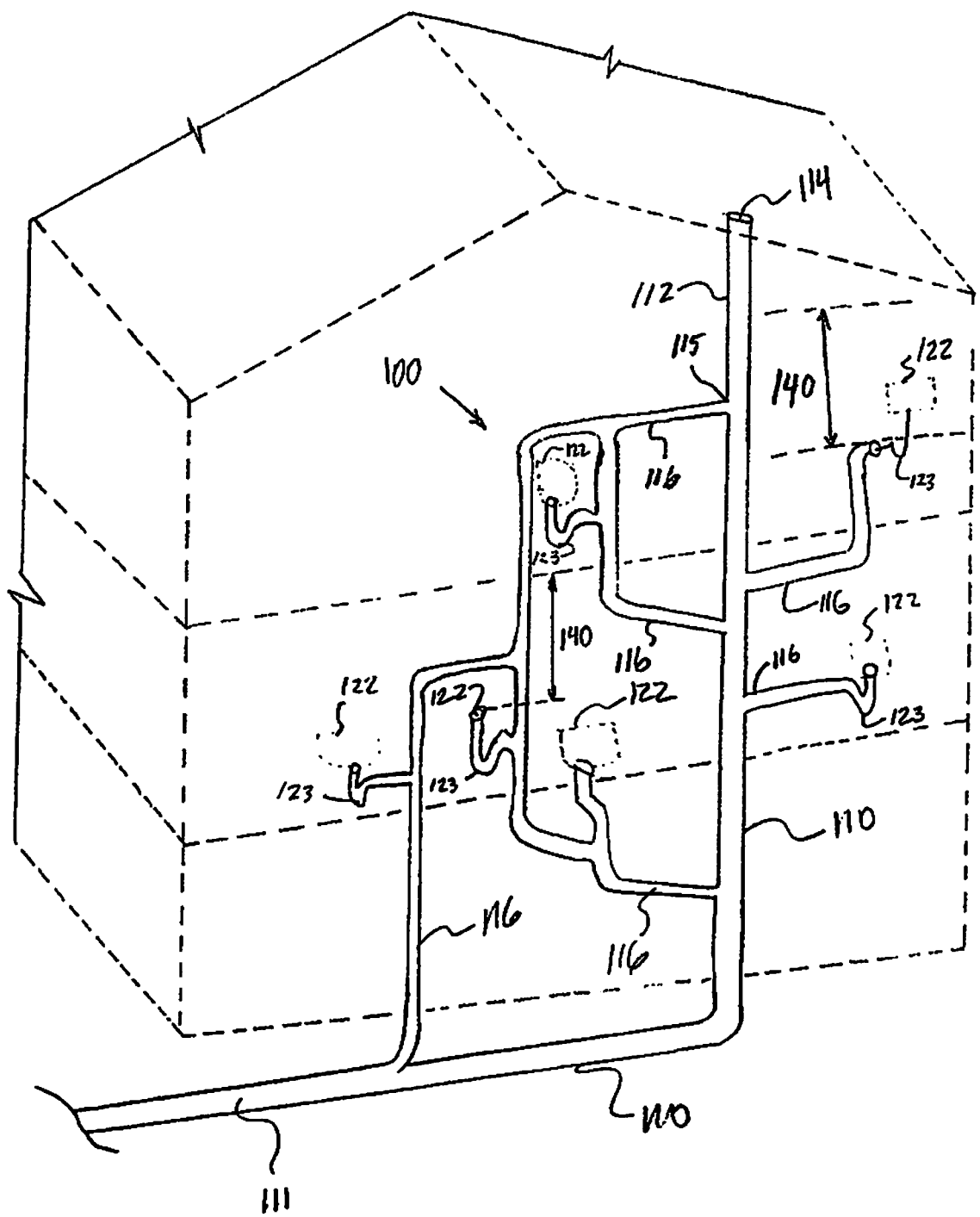
FIG. 1 is a perspective view of a piping system in which the method according to the present invention may be implemented.

With initial reference to FIGS. 1-4, the present invention is directed to a method 200 of testing for leaks within the piping system of a building. Although the method 200 according to the present invention is primarily intended to test the piping system of a home or a small residential building, i.e., up to 3 stories, it may be used to test the piping system of a larger structure, and is not necessarily limited to residential dwellings. As shown in the illustrative example of FIG. 1, the method 200 according to the present invention may be used to test the piping system 100 of a residential building comprising several stories. As is shown in the illustrative embodiments of FIGS. 1-2, the method 200 according to the present invention may be used in connection with a drainage piping system 100, which may also be referred to as a drainage system. However, the method 200 according to the present invention may also be used in connection with another type of piping system 100, for example, a piping system 100 involving a building's water supply system, or alternatively a piping system 100 involving both the drainage and supply system. In alternative embodiments, the piping system 100 may also involve a fire sprinkler system. Thus, as used herein the term "piping system" may refer to a building's drainage system, rainwater drainage, sanitary system, water supply system, and/or fire sprinkler system. Further, and also as used herein, the term "fluid" generally refers to water, which may comprise water from the building's supply system or an independent system. Furthermore, the term "fluid" may also comprise combinations of other fluids, in addition to or in lieu of water, and/or other components, including chemicals, minerals, and other related constituents, whether in liquid, solid, semi-solid, or gaseous form, or combinations thereof.

With reference again to FIGS. 1 and 2, which show different illustrative embodiments of piping systems 100 involving drainage, the method 200 according to the present invention contemplates an isolation of a main drain, which is shown at 110. Alternatively, the method 200 contemplates isolation of a main supply or main supply line of the building. The main drain 110 may comprise secondary or branching piping, which is shown at 116. The secondary piping 116 may itself connect to one or more underlying building P-traps 123 or building fixtures 122 comprising a drain (i.e., sinks, toilets, showers, bathtubs, etc.). When a supply system is involved, a main supply line of the building may similarly comprise secondary or branching piping or lines that may connect to one or more underlying building fixtures comprising an outlet, faucet, or other fluid dispensing fixture (i.e., sink faucets, toilets, showers heads, shower faucets, bathtub faucets, etc.). Thus, it is within the scope of the present invention that the piping system's 100 main drain 110 and/or main supply line be isolated. For example, the piping system's 100 main drain 110 or main supply line, may be isolated individually, or may be collectively isolated.

As used herein, the term "isolation" or "isolate" are interchangeable and may refer to a separation of the main drain 110 and/or main supply line respectively from larger drainage system and/or supply system that may also service other buildings. The terms "isolation" or "isolate" may also refer to a separation of a section of the piping system 100 from the rest of the piping system 100. Such a larger drainage system and/or supply system may comprise, without limitation, the drainage system and/or supply system of a city, county, township, neighborhood, territory, zone, division, subdivision, lot, parcel, precinct, or other municipality or sector that services more than one building. For example, an isolation of the main drain 110 of a building, or the main supply line of a building, may be achieved by closing a drainage system valve or water supply line valve, which may be located on an exterior of the footprint of the building or in another location in proximity to where the main drain 110 or main supply line enters the building. As another example, isolation of the main drain 110 and/or main supply line of a building may be accomplished by severing the main drain and/or main supply line and either installing cap or other closing mechanism to restrict flow respectively into or out of the building's piping system 100.

The method 200 according to the present invention may be used to 200 to collectively test the building's piping system 100 for leaks, i.e., testing substantially the entirety of the supply system and/or drainage system. Additionally, the method 200 according to the present invention may be used to individually test a section of the supply system and/or drainage system. For example, a section of the building's piping system 100 may include an entire floor or part of a floor of the building, i.e., a room, bathroom, kitchen, or other area. A section of the building's piping system 100 may also include a one or more floors of a building, or a stack. As used herein, a "stack" refers to a portion of the building's piping system that is in proximity to a riser or vertical segment of the main drain 110 or the main supply line.

Figure 3:
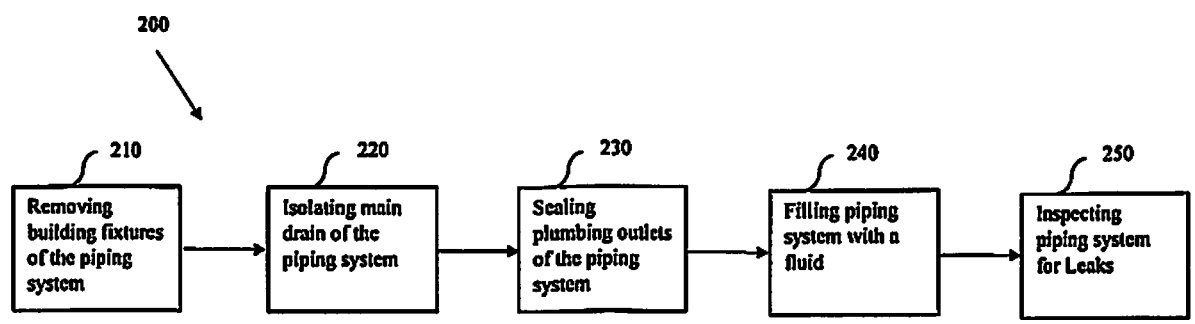
FIG. 3 is a diagrammatic representation of one embodiment of the method according to the present invention.
Figure 4:
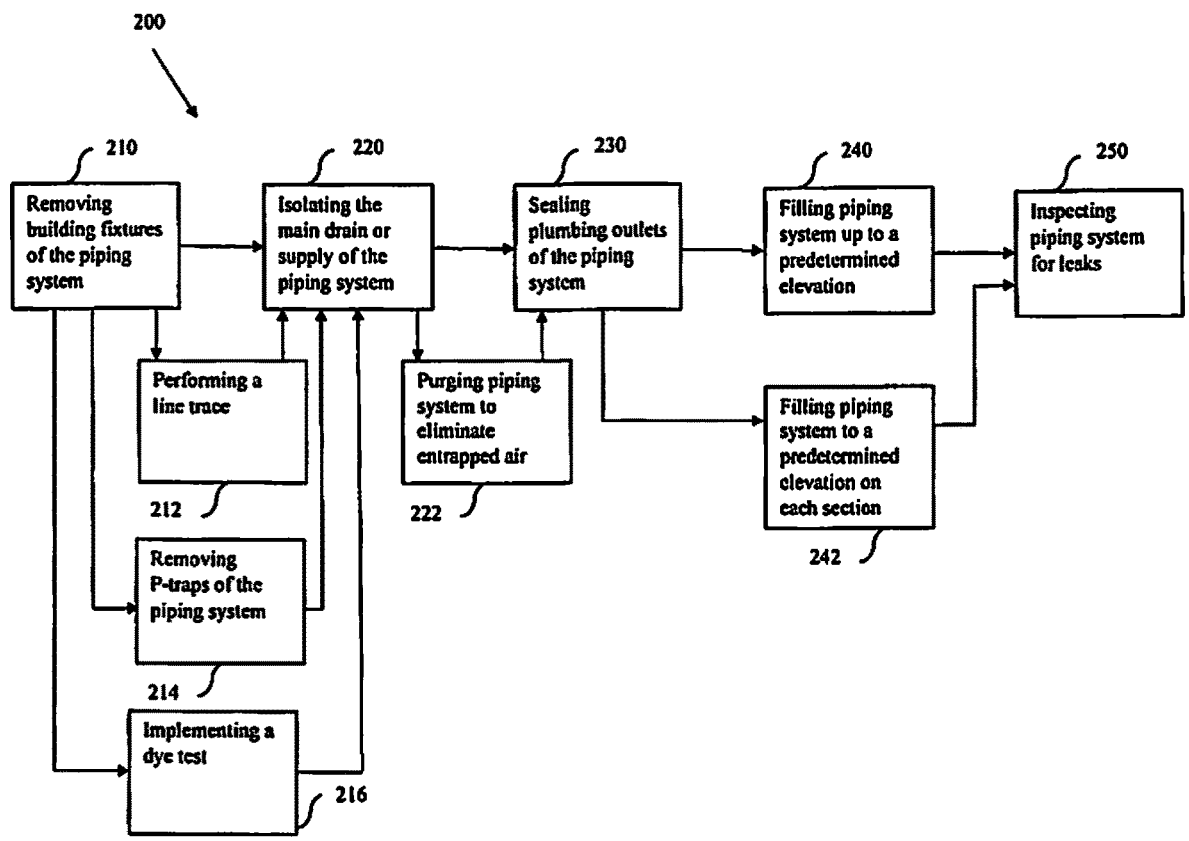
FIG. 4 is a diagrammatic representation of another embodiment of the method according to the present invention.

With reference now to FIGS. 3-4, the method 200 according to the present invention generally comprises removing the building fixtures of the piping system, which is indicated at 210. It is possible, however, that removal of the building fixtures may not be necessary in certain situations. For example, in a new construction, it is possible to implement the method 200 according to the present invention to test the piping system before installation of the building fixtures. Similarly, and as shown in FIGS. 3-4, it is also possible to implement the inventive method 200 in a renovation project before installation of new building fixtures. Additionally, as shown in FIG. 4 at 214, the method 200 may comprise removal of P-traps in the underlying piping system 100. While it is contemplated that removal of all or substantially all P-traps in the piping system 100 may provide some advantages in the accuracy and ease in which the method 200 may be implemented, it is possible to implement the method 200 according to the present invention without removing any of the P-traps, or with removing only some or the majority of the P-traps. It is contemplated that after removal of the building fixtures and/or P-traps that the plumbing outlets or otherwise points of connection, i.e., from the piping system 100 to the fixtures and/or P-traps, be sealed. This may accomplished, for example, by installing caps, e.g., clean-out caps, seals, valves, plugs, or other related components, which may at least partially restrict flow outside of the piping system 100 at the connection point.

Even though it may not be strictly necessary, the method 200 according to the present invention comprises performing a line trace 212. As used herein, a "line trace" refers to an identification of the approximate location of one or more main or secondary pipes of the piping system 100 of the building, which may be accomplished by various devices including electronic, mechanical, magnetic, etc. In some instances, it may be necessary to identify an approximate location of the building's main or secondary piping, particularly, if these are confined within the walls, floors, ceiling, roof, or other parts of the building. In some embodiments, visual devices, i.e., cameras may also be used to perform a line trace. For example, the piping system 100 may be accessed through the point of connection to a P-trap or building fixture. Alternatively, various components of the piping system 100 may also be accessed by removing an already installed clean-out cap.

As is further shown in FIG. 4, the method according to the present invention may further comprise implementing a dye test 216. As used herein, a dye test refers to the introduction of a dye, colorant, or other related material, whether in liquid, semi-liquid, solid, or semi-solid form, into at least a portion of the building's piping system 100. For example, a dye test may be implemented within a section, or portion of a section, of the building's piping system 100. Alternatively, a dye test may be implemented within substantially the entirety of the building's piping system 100. A dye test is primarily intended to facilitate a visual inspection for leaks. However, a dye test may be used to identify whether a building fixture, i.e., a faulty toilet, sink, bathtub, shower, etc., is in proper operation prior to its removal, or if it is in a faulty or otherwise damaged condition. Accordingly, this may assist to identify potential areas of leaks before implementing the inventive method 200. Accordingly, a dye test may be implemented on the building's fixtures beforehand to narrow the scope of the testing associated with the inventive method 200.

As is also shown in FIGS. 3-4 at 220, and as mentioned above, the method 200 according to the present invention further comprises isolating a main drain 110 and/or main supply line of the piping system 100. Such isolation of the main drain 110 and/or main supply line may occur on an outside of the building. For example, as is shown in FIG. 1, the main drain 110 of the building's piping system 100 may be isolated on an outside location 111 before the building's drainage system ties to the larger municipal drainage system. An isolation of the main drain 110 and/or main supply line is intended to restrict flow into or out of the building's piping system 100 from or out to the municipal system.

As shown in FIG. 4, the method 200 according to the present invention may comprise purging the piping system to eliminate entrapped air 222. It is within the scope of the present invention that after removal of the building's fixtures and/or P-traps, the piping system 100 be substantially filled with a fluid, at which point there may be some air entrapped within the piping system 100. "Purging the piping system" or "purging of the piping system" refers to at least partially reducing or otherwise substantially eliminating air that may be entrapped within the piping system 100. Thus, the method 200 according to the present invention may involve filling the piping system 100 up to the ground or floor level elevation to purge entrapped air. Filling the piping system 100 may be accomplished by using water from the building's water supply system. Furthermore, purging the piping system may be accomplished with open airways, i.e., unplugged or unsealed plumbing outlets, to provide a means for the entrapped air to escape.

With reference again to FIGS. 3-4, and as shown at 230. The method 200 according to the present invention comprises sealing the plumbing outlets of the piping system 100. The method 200 according to the present invention contemplates sealing the plumbing outlets of the piping system 100 after isolating the main drain 110 or main supply line, as well as after filling and purging the piping system 100. As a non-limiting example, the plumbing outlets may be sealed with test balls or test plugs. Further, different sections of the piping system 100 may be isolated from the rest of the piping system so that they may be tested individually. Alternatively, once the building's piping system 100 is isolated from a larger municipal piping system, the entire piping system 100 may be tested. At this point the piping system 100 is said to be in a hydrostatic stage.

Figure 2:
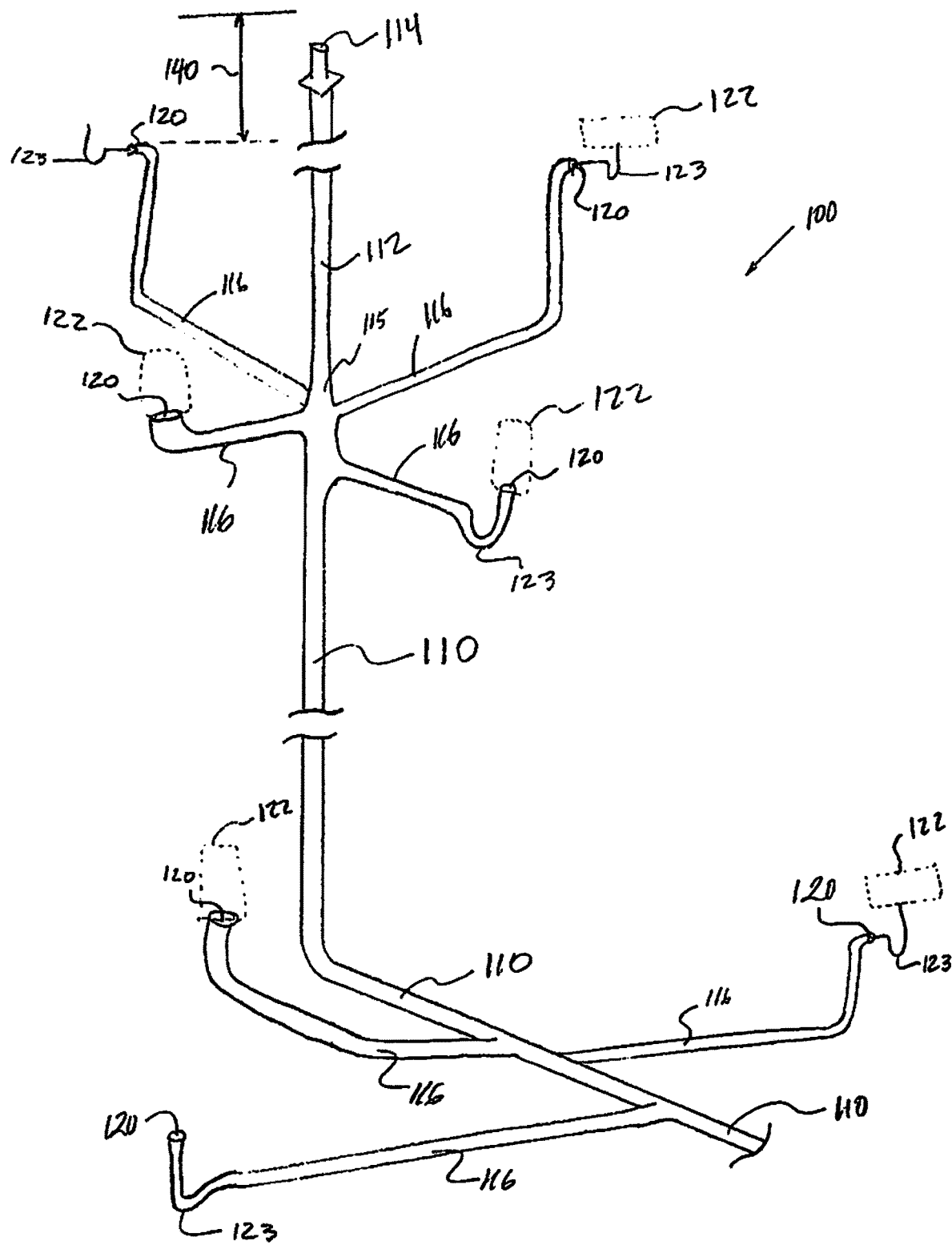
FIG. 2 is a perspective view of another embodiment of a piping system in which the method according to the present invention may be implemented.

As shown in FIG. 4 at 240, the method according to the present invention comprises filling the piping system 100 with a fluid up to a predetermined elevation. Filling the piping system 100 up to a predetermined elevation is intended to provide a sufficient head or otherwise pressure within the piping system 100 for a visual detection of leaks. Thus, the method 200 according to the present invention may comprise filling the piping system 100 up to a predetermined elevation 140 above the highest fitting connection within a section of the piping system 100. As used herein, a "highest fitting connection" may refer to a functioning segment within a section of the piping system 100 that may be at the highest elevation relative to other functioning segments within the same section. For example, the method 200 according to the present invention may comprise filling the piping system 100 up to the overall highest serviceable point 115 of the piping system 100, which is shown in FIGS. 1-2. As used herein the "highest serviceable point" 115 of the piping system 100 generally refers to the highest point where there may be an operative flow within the piping system 100. The "highest serviceable point" may also refer to the highest point at which branching piping 116 may connect to the main supply line or main drain 110 of the building. For example, as shown in FIGS. 1-2, although the main drain 110 may extend via segment 112 towards a vent relief 114, the highest serviceable point 115 of the piping system 100 may be below segment 112 and/or vent relief 114. Thus, it is contemplated that the piping system 100 may be filled up to the highest serviceable point 115 of the piping system 100, or in some embodiments up to a higher elevation, which for example may be up to a portion of segment 112. By way of example only, the piping system 100 may be filled up to at least five (5) feet above the highest serviceable point 115. Filling the piping system 100 up to the highest serviceable point 115 may be done to test the entire piping system 100 for leaks, or alternatively, a portion, e.g. a section(s), of the piping system 100.

In an alternative embodiment, the method 200 according to the present invention comprises filling the piping system 100 with a gaseous mixture. By way of example only, the gaseous mixture may comprise smoke or another mixture comprising a gas (e.g., carbon dioxide and/or water vapor) and/or small solid particles. Accordingly, the piping system 100 may be filled, including by sealing all plumbing outlets except one or more vent reliefs 114. As such, the gaseous mixture may be introduced into the piping system via one or more vent reliefs 114. In such embodiments, it may be recommended to contact the local fire department to advice about the performance of a test and to avoid unintentional emergency calls. Various types of equipment may be used to introduce the gaseous mixture into the piping system 100. These include, without limitation, smoke blowers and/or smoke candles manufactured by the company Superior® Smoke.

As is further shown in FIGS. 3-4 at 250, the method 200 according to the present invention comprises inspecting the piping system for leaks after a predetermined period of time. As used herein, the term "leaks" may refer to a fluid leak or a gas leak. While an inspection for leaks is primarily intended to be done visually, i.e., by observation or with the aid of visual equipment, i.e., camera and/or video camera, it may also be done by ascertaining a drop in the pressure and/or fluid elevation within a particular section of the piping system 100. Thus, a visual inspection may be conducted after filling the piping system 100, or section thereof, to the predetermined elevation, and/or after a period of time which may generally range from immediately after filling the piping system 100 to about twenty minutes thereafter. In order to effectively identify leaks through a visual inspection, it is beneficial to wait at least about fifteen minutes after filling the piping system 100. However, such a predetermined period of time may change according to the particulars of the building's piping system 100, including its capacity, span, number of stories in the building, as well as environmental conditions, i.e., temperature, humidity, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of testing for leaks in a building's piping system, the method comprising the steps of:
   (a) removing at least a majority of the plumbing fixtures of the piping system,
   (b) performing a line trace to ascertain the approximate location of one or more main or secondary pipes of the building's piping system,
   (c) isolating a main drain of the building,
   (d) sealing all of the plumbing outlets of the piping system,
   (e) filling the piping system with a fluid up to a predetermined elevation above a highest functioning segment of the piping system, and
   (f) inspecting the piping system for leaks after about 15 minutes to about 25 minutes.

2. The method as recited in claim 1 wherein removing at least a majority of the plumbing fixtures in the building comprises removing all of the plumbing fixtures in the piping system.

3. The method as recited in claim 1 wherein step (a) further comprises removing all of the P-traps in the piping system.

4. The method as recited in claim 1 wherein isolating the main drain of the building comprises isolating the main drain of the building on the exterior of the building.

5. The method as recited in claim 1 wherein sealing all of the plumbing outlets of the piping system comprises sealing all of the plumbing outlets of the piping system with test balls.

6. The method as recited in claim 1 wherein sealing all of the plumbing outlets of the piping system comprises sealing all of the plumbing outlets of the piping system with air plugs.

7. The method as recited in claim 1 wherein inspecting the piping system after a predetermined period of time comprises visually inspecting the piping system after a predetermined period of time.

8. The method as recited in claim 1 wherein inspecting the piping system after a predetermined period of time comprises inspecting the piping system after about 15 minutes to about 25 minutes.

9. The method as recited in claim 1 wherein filling the piping system with a fluid to a predetermined elevation above the highest fitting connection comprises filling the piping system with water to an elevation of at least five feet above the highest fitting connection of the piping system.

10. The method as recited in claim 1 wherein filling the piping system with a fluid to a predetermined elevation above the highest fitting connection comprises filling each section of the piping system with a fluid to a predetermined elevation.

11. The method as recited in claim 10 wherein filling the piping system with a fluid to a predetermined elevation above the highest fitting connection comprises filling each section of the piping system with water to an elevation of at least five feet above the highest fitting connection within each section of the piping system.

12. A method of testing for leaks in a building's piping system, the method comprising the steps of:
  (a) removing all of the plumbing fixtures and P-traps of the piping system,
  (b) isolating the main building drain on the exterior of the building,
  (c) purging the piping system to the floor level with water from the supply line of the building to eliminate at least a portion of the entrapped air within the piping system,
  (d) sealing all of the plumbing outlets of the piping system,
  (e) filling the piping system with a fluid up to an elevation of at least five feet above a highest functioning segment within a section of the piping system of the building, and
  (f) visually inspecting the piping system for leaks after at least fifteen minutes.

13. The method as recited in claim 12 wherein step (a) further comprises inserting a dye on an interior of the building's piping system to test the at least majority of plumbing fixtures.

14. The method as recited in claim 12 wherein isolating the building drain on the exterior of the building comprises isolating the building drain on the exterior of the building with a clean-out cap.

15. The method as recited in claim 12 wherein filling the piping system with a fluid up to an elevation of at least five feet above the highest fitting connection comprises filling the piping system with water from the supply line of the building up to an elevation of at least five feet above the highest fitting connection.

16. A method of testing for leaks in a building's piping system, the method comprising the steps of:
  (a) inserting a dye on an interior of the building's piping system to test at least a majority of plumbing fixtures for leaks thereon,
  (b) removing all of the plumbing fixtures and P-traps of the piping system,
  (c) isolating the main building drain on the exterior of the building,
  (d) purging the piping system to the floor level with water from the supply line of the building and with open airways to eliminate at least a portion of the entrapped air within the piping system,
  (e) sealing all of the plumbing outlets of the piping system,
  (f) filling each section of the piping system with a water up to an elevation of at least five feet above the highest functioning segment within each section of the piping system, and
  (g) visually inspecting the piping system for leaks after at least fifteen minutes.

\* \* \* \* \*